United States Patent
Zhu

(10) Patent No.: US 11,746,625 B2
(45) Date of Patent: Sep. 5, 2023

(54) NOZZLE FOR WATER CHOKING

(71) Applicant: Variperm Energy Services Inc., Calgary (CA)

(72) Inventor: Da Zhu, Calgary (CA)

(73) Assignee: Variperm Energy Services Inc., Calgary (CA)

( * ) Notice: Subject to any disclaimer, the term of this patent is extended or adjusted under 35 U.S.C. 154(b) by 129 days.

(21) Appl. No.: 17/432,917

(22) PCT Filed: Feb. 24, 2020

(86) PCT No.: PCT/CA2020/050233
§ 371 (c)(1),
(2) Date: Aug. 21, 2021

(87) PCT Pub. No.: WO2020/168438
PCT Pub. Date: Aug. 27, 2020

(65) Prior Publication Data
US 2022/0186590 A1  Jun. 16, 2022

Related U.S. Application Data

(60) Provisional application No. 62/809,704, filed on Feb. 24, 2019.

(51) Int. Cl.
*F16L 55/027* (2006.01)
*E21B 43/12* (2006.01)
(Continued)

(52) U.S. Cl.
CPC ........... *E21B 43/12* (2013.01); *F16L 9/18* (2013.01); *F16L 55/027* (2013.01); *F16L 55/24* (2013.01)

(58) Field of Classification Search
CPC ............ F16L 55/027; F16L 55/02727; F16L 55/02754; F15D 1/025; E21B 41/0078; E21B 43/24
(Continued)

(56) References Cited

U.S. PATENT DOCUMENTS 1,698,314 A * 1/1929 Mapelsden ............... G01F 1/44
138/44
1,744,842 A * 1/1930 Suverkrop ............ F16L 55/027
138/44
(Continued)

FOREIGN PATENT DOCUMENTS

CA  2622939 A1  10/2008
CA  2679148 A1  3/2010
(Continued)

OTHER PUBLICATIONS

International Search Report and Written Opinion received for PCT serial No. PCT/CA2019/050636 dated Jul. 17, 2019, 9 pages.
(Continued)

*Primary Examiner* — Patrick F Brinson
(74) *Attorney, Agent, or Firm* — Dykema Gossett PLLC

(57) ABSTRACT

A nozzle for controlling the flow of a water and/or gas component of a fluid produced from a hydrocarbon-bearing reservoir, the fluid comprising oil and water and/or gas, the nozzle comprising a fluid passage extending between an inlet and an outlet, wherein the fluid passage comprises an uneven surface for imparting turbulence to the water and/or gas component of the fluid.

20 Claims, 6 Drawing Sheets

(51) Int. Cl.
*F16L 9/18* (2006.01)
*F16L 55/24* (2006.01)

(58) Field of Classification Search
USPC .................. 138/37–44; 73/861.61, 861.63
See application file for complete search history.

(56) References Cited

U.S. PATENT DOCUMENTS

| | | | | |
|---|---|---|---|---|
| 3,894,562 | A | * | 7/1975 | Moseley, Jr. .............. F15D 1/02 |
| | | | | 138/44 |
| 4,648,455 | A | | 3/1987 | Luke |
| 5,092,159 | A | | 3/1992 | Chien |
| 5,141,055 | A | | 8/1992 | Chien et al. |
| 5,918,636 | A | * | 7/1999 | Mitchell ................. C02F 1/482 |
| | | | | 210/222 |
| 6,524,368 | B2 | * | 2/2003 | Betting ..................... B04C 3/00 |
| | | | | 96/389 |
| 6,708,763 | B2 | | 3/2004 | Howard et al. |
| 7,419,002 | B2 | | 9/2008 | Dybevik et al. |
| 7,537,056 | B2 | | 5/2009 | MacDougall |
| 8,474,535 | B2 | | 7/2013 | Richards et al. |
| 8,496,059 | B2 | | 7/2013 | Schultz et al. |
| 8,689,883 | B2 | | 4/2014 | Kim |
| 9,027,642 | B2 | | 5/2015 | Sladic et al. |
| 9,249,649 | B2 | | 2/2016 | Fripp et al. |
| 9,518,455 | B2 | | 12/2016 | Franklin et al. |
| 9,631,461 | B2 | | 4/2017 | Lopez et al. |
| 9,638,000 | B2 | | 5/2017 | Dyck |
| 2002/0162589 | A1 | | 11/2002 | Lorch et al. |
| 2006/0048942 | A1 | | 3/2006 | Moen et al. |
| 2006/0118296 | A1 | | 6/2006 | Dybevik et al. |
| 2008/0041588 | A1 | | 2/2008 | Richards et al. |
| 2008/0283238 | A1 | | 11/2008 | Richards et al. |
| 2011/0198097 | A1 | | 8/2011 | Moen |
| 2012/0006563 | A1 | | 1/2012 | Patel et al. |
| 2014/0319970 | A1 | | 10/2014 | Sherrit et al. |
| 2015/0292300 | A1 | * | 10/2015 | Franklin ................. E21B 43/12 |
| | | | | 166/244.1 |
| 2016/0010425 | A1 | | 1/2016 | Dyck |
| 2016/0160616 | A1 | | 6/2016 | Moen et al. |
| 2017/0044868 | A1 | | 2/2017 | Van Petegem et al. |
| 2017/0058655 | A1 | | 3/2017 | Lastiwka |
| 2018/0030812 | A1 | | 2/2018 | Ning et al. |
| 2018/0045027 | A1 | | 2/2018 | Haley et al. |
| 2021/0115769 | A1 | * | 4/2021 | Zhu ..................... E21B 41/0078 |
| 2021/0230979 | A1 | * | 7/2021 | Zhu ....................... E21B 43/241 |
| 2021/0246764 | A1 | * | 8/2021 | Zhu ......................... E21B 43/12 |
| 2021/0254435 | A1 | * | 8/2021 | Zhu ......................... E21B 43/12 |
| 2022/0025745 | A1 | * | 1/2022 | Zhu ......................... E21B 43/12 |

FOREIGN PATENT DOCUMENTS

| | | |
|---|---|---|
| CA | 2934369 A1 | 6/2015 |
| CA | 2887860 C | 1/2017 |
| CA | 2862161 C | 5/2017 |
| CA | 2862111 C | 8/2017 |
| CA | 2959880 A1 | 9/2017 |
| CA | 2917392 C | 1/2018 |
| CA | 2871354 E | 6/2019 |
| WO | 2019/090425 A1 | 5/2019 |
| WO | 202006914 A1 | 4/2020 |

OTHER PUBLICATIONS

International Search Report and Written Opinion received for PCT serial No. PCT/CA2019/050942 dated Sep. 17, 2019, 8 pages.
International Search Report and Written Opinion received for PCT serial No. PCT/CA2019/051407 dated Dec. 12, 2019, 6 pages.

* cited by examiner

NOZZLE FOR WATER CHOKING

FIELD OF THE DESCRIPTION

The present description relates to nozzles, or flow control devices, used for controlling flow of fluids into a tubular member. In a particular aspect, the nozzles are adapted for use on tubular members used for producing hydrocarbons from subterranean reservoirs. More particularly, the described flow control devices assist in choking or limiting the flow of water from a reservoir into production tubing.

BACKGROUND

Subterranean hydrocarbon reservoirs are generally accessed by one or more wells that are drilled into the reservoir to access hydrocarbon materials, in particular oil. The oil is then pumped to the surface through production tubing provided in the wells. The wells drilled into the reservoirs may be vertical or horizontal or at any angle there-between.

In conventional onshore or offshore oil production methods, one or more wells are drilled into the hydrocarbon containing reservoir and the hydrocarbon materials are brought to surface, or "produced", via the production tubing. Such tubing is placed in the wells, or wellbores, to serve as a conduit for the hydrocarbons. Typically, production tubing comprises a number of segments, or tubulars, that are joined together. The tubing generally includes a number of apertures, or ports, along at least a portion of its length to allow oil from the reservoir to flow into the lumen of the tubing. The segments of tubing having ports may be provided with one or more filtering devices, such as sand screens, which serve to prevent or mitigate against sand and other solid debris in the well from entering the tubing.

One problem that is frequently encountered in oil production is that of water breakthrough, which generally involves the preferential production of water contained in the reservoir instead of oil, thereby resulting in a reduction in the oil production rate. As would be understood, this problem detrimentally affects the economics of the well. Preferential production of water occurs as a result of the lower viscosity of water as compared to oil. This preferential production may occur at one or more locations along the length of the production tubing and results in "water coning". A similar problem is also encountered in reservoirs where gas is present with the oil, where the gas, being more mobile, is preferentially produced over oil, resulting in "gas coning".

To address the above-noted problems, production tubing is usually provided with inflow control devices, ICDs, or nozzles, which serve to restrict the flow of fluids into the tubing and thereby delay or avoid water and/or gas breakthrough. Typically, ICDs are provided in combination with sand screens or other such filtering tools or assemblies and are situated adjacent the ports on the production tubing. Examples of known ICDs designed for restricting undesired production of water and/or gas are provided in: US 2017/0044868; U.S. Pat. No. 7,537,056; US 2008/0041588; and, U.S. Pat. No. 8,474,535. Many of these ICDs involve the use of moving elements that dynamically adjust to changes in local fluid characteristics (e.g. viscosity and/or velocity) and as a result are usually complicated in design, expensive, and/or prone to failure.

There exists a need for an improved device for controlling or limiting the production of water, and possibly gas, from an oil reservoir.

SUMMARY OF THE DESCRIPTION

In one aspect, there is provided a nozzle for limiting or choking the flow of water and/or gas into a pipe, the pipe having at least one port along its length, the nozzle being adapted to be located on the exterior of the pipe, the nozzle comprising first and second openings and a fluid passage extending there-between, and wherein the fluid passage includes a converging inlet portion, a diverging outlet portion, and a central section extending between the inlet portion and the outlet portion, wherein the central section includes an uneven surface, such as a wavy surface.

In one aspect, there is provided a nozzle for controlling the flow of a water and/or gas component of a fluid comprising a mixture of oil and water and/or gas, into a pipe, the pipe having at least one port along its length, the nozzle being adapted to be located on the exterior of the pipe and adjacent one of the at least one port, the nozzle comprising:
  a body having an inlet, an outlet, and a fluid conveying passage extending between the inlet and outlet;
  wherein the fluid conveying passage comprises:
  an inlet portion proximal to the inlet and having a converging region with a reducing diameter in a direction from the inlet to the outlet;
  an outlet portion proximal to the outlet and having a diverging region with an increasing diameter in a direction from the inlet to the outlet; and,
  a central section extending between the inlet portion and the outlet portion, the central section comprising a passage formed by a wall having an uneven surface.

In another aspect, there is provided an apparatus for controlling flow, from a subterranean reservoir, of a water and/or gas component of a fluid comprising an oil, the apparatus comprising a pipe having at least one port along its length, and at least one nozzle adapted to be located on the exterior of the pipe and in fluid communication with one of the at least one port, the nozzle comprising:
  a body having an inlet, an outlet, and a fluid conveying passage extending between the inlet and outlet;
  wherein the fluid conveying passage comprises:
  an inlet portion proximal to the inlet and having a converging region with a reducing diameter in a direction from the inlet to the outlet;
  an outlet portion proximal to the outlet and having a diverging region with an increasing diameter in a direction from the inlet to the outlet; and,
  a central section extending between the inlet portion and the outlet portion, the central section comprising a passage formed by a wall having an uneven surface;
  the apparatus further comprising a means for locating the nozzle on a pipe adjacent a port provided on the pipe.

BRIEF DESCRIPTION OF THE FIGURES

The features of certain embodiments will become more apparent in the following detailed description in which reference is made to the appended figures wherein.

DETAILED DESCRIPTION

Figure 1:
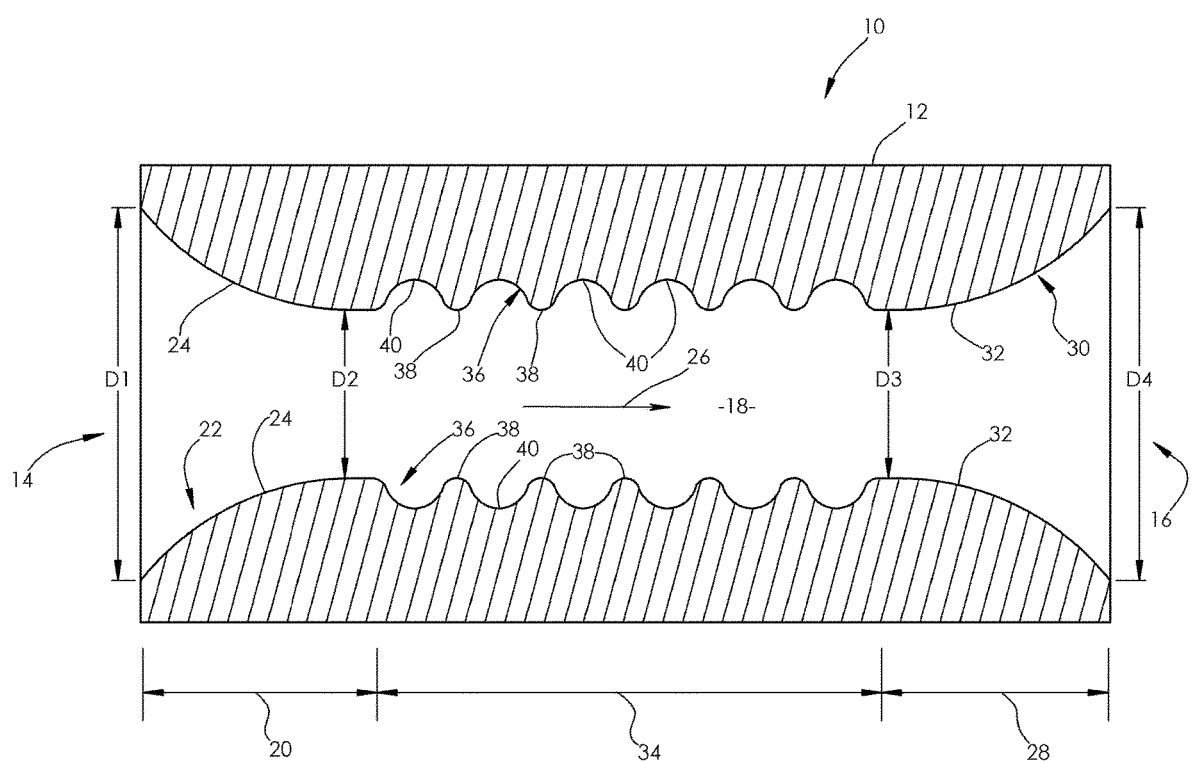
FIG. 1 is a side cross-sectional view of a flow control nozzle according to an aspect of the present description.

As used herein, the terms "nozzle" or "nozzle insert" will be understood to mean a device that controls the flow of a fluid flowing there-through. In one example, the nozzle described herein serves to control the flow of a fluid through a port in a pipe in at least one direction. More particularly, the nozzle described herein comprises an inflow control device, or ICD, for controlling the flow of fluids, or one or more components of a fluid mixture, into a pipe.

The terms "regulate", "limit", "throttle", and "choke" may be used herein. It will be understood that these terms are intended to describe an adjustment of the flow of a fluid passing through the nozzle described herein. The present nozzle is designed to choke the flow of a fluid or a component of a fluid mixture, in particular a low viscosity fluid, such as water, flowing from a reservoir into a pipe. The flow of a fluid through a passage is considered to be "choked" when a further decrease in downstream pressure, without any difference in upstream pressure, does not result in an increase in the mass flow rate of the fluid. Choked flow is also referred to as "critical flow". Such choked flow is known to arise when the passage includes a reduced diameter section, or throat, such as in the case of convergent-divergent nozzles. In such nozzles, the flowing fluid accelerates, with a resulting reduction in pressure, as it moves towards and flows through the throat and subsequently decelerates, and recovers pressure, in the diverging section downstream of the throat. In the special case where the fluid velocity at the throat approaches the local sonic velocity, i.e. Mach 1, the mass flow rate of the fluid cannot increase further for a given inlet pressure and temperature, despite a reduction in outlet or downstream pressure. In other words, the fluid flow rate remains unchanged even where the downstream pressure is decreased.

The term "hydrocarbons" refers to hydrocarbon compounds that are found in subterranean reservoirs. Examples of hydrocarbons include oil and gas. For the purpose of the present discussion, "hydrocarbon" will be mainly used in relation to oil.

The term "wellbore" refers to a bore drilled into a subterranean formation, in particular a formation containing hydrocarbons.

The term "wellbore fluids" refers to hydrocarbons and other materials contained in a reservoir that are capable of entering into a wellbore. The present description is not limited to any particular wellbore fluid(s).

The terms "pipe" or "base pipe" refer to a section of pipe, or other such tubular member. The base pipe is generally provided with one or more ports or slots along its length to allow for flow of fluids there-through.

The term "production" refers to the process of producing wellbore fluids, in particular, the process of conveying wellbore fluids from a reservoir to the surface. In the case of oil wells, for example, it would be understood that it is desirable, in particular economically desirable, to produce more of the oil in a given reservoir than other fluids (such as water and, in some cases, gas) that are present in the reservoir along with the oil.

The term "production tubing" refers to a series of pipes, or tubulars, connected together and extending through a wellbore from the surface into the reservoir.

The terms "screen", "sand screen", "wire screen", or "wire-wrap screen", as used herein, refer to known filtering or screening devices that are used to inhibit or prevent sand or other solid material from the reservoir from flowing into the pipe. Such screens may include wire wrap screens, precision punched screens, premium screens or any other screen that is provided on a base pipe to filter fluids and create an annular flow channel. The present description is not limited to any particular screen, including those described herein.

The terms "comprise", "comprises", "comprised" or "comprising" may be used in the present description. As used herein (including the specification and/or the claims), these terms are to be interpreted as specifying the presence of the stated features, integers, steps or components, but not as precluding the presence of one or more other feature, integer, step, component or a group thereof as would be apparent to persons having ordinary skill in the relevant art.

In the present description, the terms "top", "bottom", "front" and "rear" may be used. It will be understood that the use of such terms is purely for the purpose of facilitating the present description. These terms are not intended to limit the orientation or placement of the described elements or structures in any way.

In general, the present description relates to a flow control device, or nozzle, that serves to control or regulate the flow of certain fluids from a reservoir into a base pipe, or section of production tubing. As discussed above, in one aspect, such regulation is often required in order to preferentially produce a desired hydrocarbon material, e.g. oil, over undesired fluids from a reservoir. For the purpose of the present description, it is desired to produce oil and to limit the production of water or gas contained in a reservoir. As would be known to persons skilled in the art, the water or gas component of a reservoir, having a lower viscosity, is more mobile than the oil component, and therefore more easily travels towards and into the production tubing. Thus, regulation of the water flow is desirable in order to increase the oil to water production ratio.

Generally, the nozzles described herein serve to choke the flow of water and/or gas from the reservoir into production tubing. More particularly, the presently described nozzles incorporate a unique geometry that utilizes the different fluid dynamic properties of water (and/or gas) as compared to oil. In particular, the nozzles described herein incorporate a unique internal profile that results in the choking of the flow of water and/or gas component(s) of a reservoir, as a result of their lower viscosity, without any significant choking effect on the more viscous oil component of a reservoir. The nozzles described herein are particularly useful in conventional and offshore oil extraction operations.

For convenience, the nozzles described herein will be described in reference to the choking effect on the water component; however, it will be understood that such nozzles may also be used for choking the gas component(s) as well. In addition, for convenience, reference will be made to the singular "nozzle"; however, it will be understood that this is not intended to limit the nozzles described herein to any one particular embodiment. It will also be understood that, unless stated otherwise, features of one described embodiment may be incorporated into any other described embodiment.

As discussed above, the nozzle described herein is designed to "choke back" the flow of water into production tubing, that is, to preferably increase the flowrate ratio of oil to water from a subterranean reservoir. Thus, the presently described nozzle is designed with the aim of maintaining or increasing the flow rate of the oil component of a hydrocarbon containing reservoir while decreasing or choking the flow rate of the water component thereof. For this purpose, the nozzle described herein, and as illustrated at 10 in FIG. 1, comprises in one aspect a body 12 having an inlet 14, for receiving fluids from a reservoir, and an outlet 16 for directing the fluids into production tubing. As known in the art, and as described further below, the production tubing is typically provided with at least one port that is adapted to be in fluid communication with the nozzle outlet 16. Such fluid communication can be direct, wherein the nozzle outlet 16 is in direct fluid communication with the port, or indirect, wherein fluid exiting the outlet 16 is diverted into the port by one or more flow diverters and the like as would be known to persons skilled in the art.

The nozzle 10 also includes a flow path, or passage 18, extending between the inlet 14 and the outlet 16. The direction of flow through the nozzle 10 is shown by the arrow A. As would be understood, when in use, the inlet 14 of the nozzle 10 is positioned to receive fluids from a subterranean reservoir. As discussed further below, the fluids may first pass through a screen or the like. Further, and as also discussed further below, the nozzle, when in use, is positioned on a section of production tubing so as to allow fluids exiting the outlet 16 to enter, either directly or indirectly, into at least one of the ports provided on the production tubing.

As illustrated in FIG. 1, the passage 18 of the nozzle 10 is provided with three main sections. A first, or inlet section 20 of the passage 18 is provided proximal to the inlet 14 and comprises a converging region 22 defined by a generally smooth and curved wall 24. As illustrated in FIG. 1, the inlet section 20 has a first, or inlet diameter D1 provided at the inlet 14, and a gradually decreasing diameter when moving along the direction of flow 26. The diameter of the inlet section 20 reaches a narrowed or converged diameter D2, located away from the inlet 14. As shown, diameter D1, or the inlet diameter of the nozzle 10, is greater than diameter D2.

A second, or outlet section 28 of the passage 18 is provided proximal to the outlet 16 and comprises a diverging region 30 defined by a generally smooth and curved wall 32. As illustrated in FIG. 1, the outlet section 28 has a diameter D3 provided at a distance away from the outlet 16, in the direction towards the inlet 14, and a gradually increasing diameter when moving along the direction of flow 26. The diameter of the outlet section reaches a maximum diameter D4, or the outlet diameter of the nozzle 10, at the outlet 16. As shown, diameter D4 is greater than diameter D3.

As will be understood, the term "gradually" as used above with respect to the inlet and outlet regions will encompass a wall with a curved surface, as those shown in FIG. 1 at 24 and 32, as well as a linearly shaped surface.

In one aspect, the inlet diameter D1 and outlet diameter D4 may be the same or different. In a preferred aspect, diameter D1 is greater than or equal to diameter D4.

In one aspect, the degree of convergence of the inlet section (that is, the rate of change of the diameter of the wall 24) is the same or different as the degree of divergence of the outlet section (that is, the rate of change of the diameter of the wall 32). In a preferred aspect, both the degree of convergence of the inlet section and the degree of divergence of the outlet section are gradual so as to allow a smooth flow of fluid there-through.

The passage 18 of the nozzle 10 includes a third section 34 extending between the inlet section 20 and the outlet section 28. As illustrated in FIG. 1, the third section 34 of the passage 18 is provided with a wall 36 having an uneven surface, such as, for example, a generally wavy surface as shown, having a plurality of peaks 38, extending into the lumen of the passage 18, and plurality of valleys or troughs 40, extending away from the lumen of the passage 18. It will be understood that other shapes and geometries of the uneven surface are possible for the purpose described herein. For example, the peaks 38 may be pyramidal in shape or may be square. All or some of the peaks 38 and/or troughs 40 may also be symmetrical, as shown herein, or may be asymmetrical. However, for convenience, reference will be made herein to "uneven" or "wavy" to encompass all such shapes and configurations. The purpose of such wavy surface will be described further below. The present description is not limited to any particular size, shape or number of the peaks 38 and/or troughs 40. The peaks 38 and troughs 40 of the third section 34 are also not limited to any particular frequency or positioning. That is, the peaks 38 and troughs 40 also do not need to be symmetrically located along the length of the third section 34.

In FIG. 1, the peaks 38 are illustrated as generally providing the passage 18 with a minimum diameter that is generally the same as diameter D2 or D3. It will be understood that such illustration is an example of one aspect of the present description and is not intended to be a limitation. Thus, the minimum diameter of the passage 18 in the third section 34 may, in other aspects, be less than D2 and/or D3. In such case, it will be understood that the peaks 38 would protrude further into the passage 18 than is shown in FIG. 1.

Figure 2:
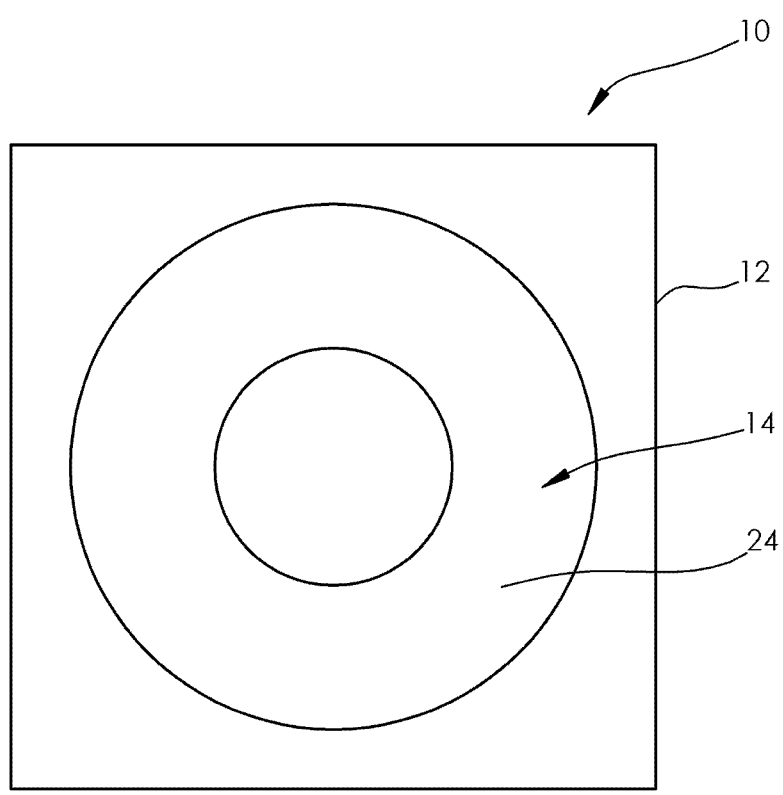
FIG. 2 is an end view of the flow control nozzle of FIG. 1, showing the inlet thereof.

FIG. 2 illustrates an end view of the nozzle 10 of FIG. 1 showing the inlet 14 and the wall 24.

Figure 4:
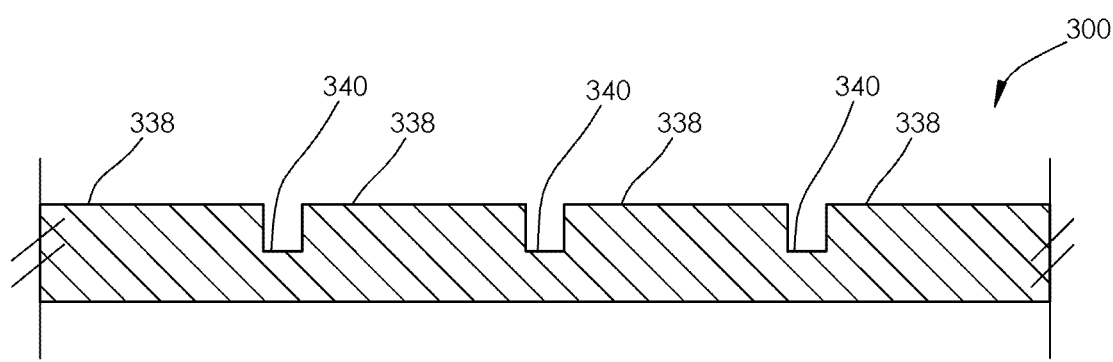
FIG. 4 is a partial side cross-sectional view of a flow control nozzle according to another aspect of the present description.

FIG. 4 illustrates another version or embodiment of the nozzle described herein. In this example, only a portion of the nozzle, and in particular the third section, is shown. In FIG. 4, the nozzle is identified at 300 and includes generally planar shaped "peaks" 338 that are interrupted by grooves, which form the "valleys or troughs" 340, which may also be relatively square shaped in cross section. As would be understood, this uneven surface would appear generally planar with generally circular grooves formed by the troughs 340. In one example, the section shown in FIG. 4 may be 100 mm in length with each peak 338 being 24 mm in length. It will be understood that these dimensions are only provided by way of example and are not intended to limit the scope of the description in any way.

Without being limited to any particular theory, the function of the present nozzle will now be described. As would be understood, the wavy surface of the wall 36 is designed to take advantage of the difference in drag coefficients that is known to exist between laminar and turbulent flows of fluids. In particular, as known to persons skilled in the art, the drag force, $C_D$, or friction factor, exerted by a pipe wall on a flowing fluid is a function of the Reynolds Number, $R_e$, for laminar flows. The $R_e$, in turn, is a function of the density and viscosity of the fluid:

$$R_e = (\rho v D)/\mu$$

where: $\rho$ is the density of the fluid; v is the velocity or mass flow rate of the fluid; D is the diameter of the pipe; and p is the viscosity of the fluid. Thus, the form drag, $F_D$, of a laminar fluid flow can be expressed as:

$$F_D = 32 v \mu / D$$

For turbulent fluid flow, on the other hand, the friction factor would be constant, thus resulting in the following equation:

$$F_D = \tfrac{1}{2} c \rho v^2$$

As can be seen, the form drag, $F_D$, for laminar flow is proportional to the velocity (v), or flowrate of the fluid, whereas for turbulent flow, the form drag is proportional to the square of the flowrate. In other words, for a fluid flowing at a given velocity, it would be subjected to a greater form drag if the flow is turbulent than if it is laminar.

For an oil and water mixture flowing from a reservoir into production tubing, under a given pressure differential, the velocity of the oil component would typically be lower than that of the water component, owing to the higher viscosity of the oil. This therefore results in the following three possible fluid flow scenarios: 1) the flow of oil is laminar while the flow of water is turbulent; 2) the flow of both the oil and water components is laminar; or 3) the flow of both the oil and water components is turbulent. The first scenario is the one that is most commonly observed and, for the reasons discussed above, the turbulently flowing water will generally be subject to a higher form drag than the oil component. In this scenario, the velocity of the water component would generally be the same or, as is more likely, greater than that of the oil. Although the second and third scenarios are less common, the water component would still be subject to a higher form drag than the oil component owing to its higher velocity.

Based on the above principles, the nozzle described herein serves to generally increase the level of turbulence of a fluid flowing there-through. In particular, for a fluid comprising a mixture of oil and water, the presently described nozzle causes turbulence primarily in the faster flowing water component of the fluid, thereby leaving the oil component to flow under laminar conditions. As such, and due to the different drag force effects mentioned above, the present nozzle would exert a greater form drag on the water component of the fluid and would thereby result in a reduction, or choking, of the flow of the water component while leaving the flow of oil relatively unaffected. As will be understood, this effect on the fluid flow results primarily from the presence of the third section 34 within the passage 18 of the nozzle. As discussed above, the third section 34 includes a wall 36 having a uneven, e.g. wavy, surface that results in turbulent flow of the water component thereby exaggerating the form drag exerted on the water flowing there-through. Thus, when a fluid comprising water and oil is flowing though the present nozzle, in particular according to the flow pattern of scenario 1, the wavy surface of the passage 18 augments the form drag effect and thereby serves to restrict the flow of water more so than the flow of oil therethrough. In the result, water flow is choked while oil flow continues.

It will be understood by persons skilled in the art that any degree of inhibition of water flow from a reservoir would result in economic benefits in an oil production process. For example, even a 15% reduction in water flow would be highly desirable from an economic perspective.

Figure 5:
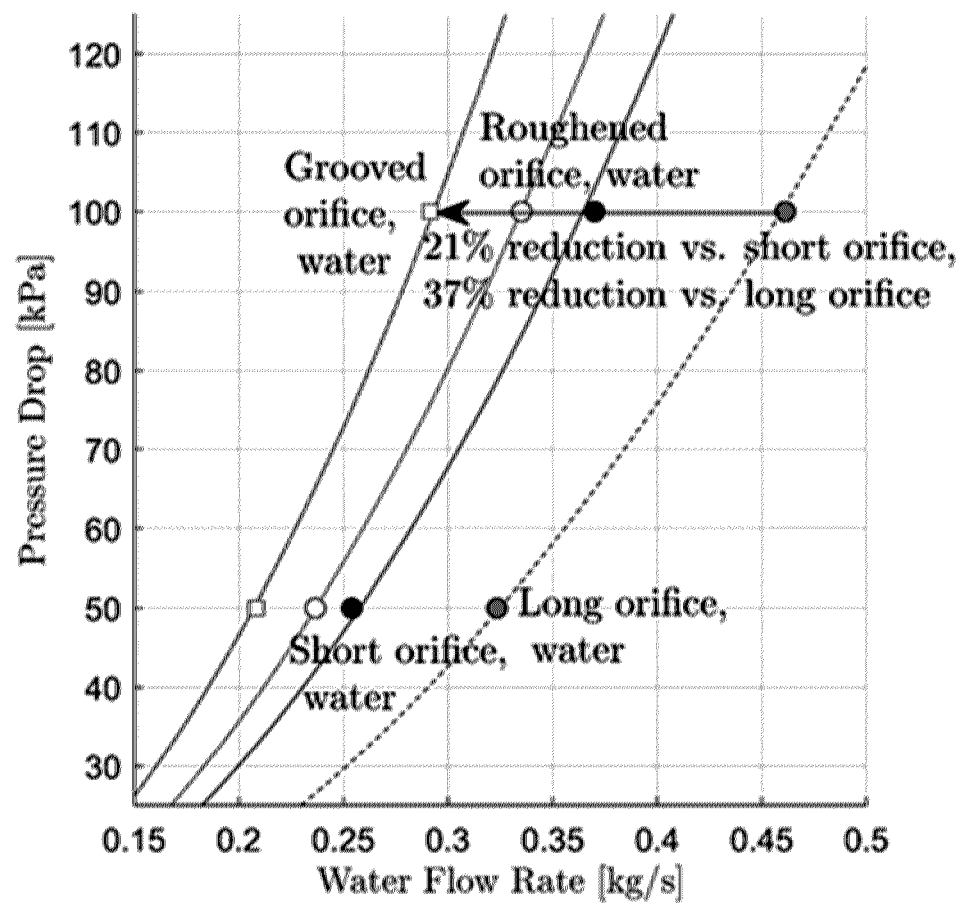
FIGS. 5 and 6 illustrate flow rate performance data of flow control nozzles according to aspects of the present description.
Figure 6:
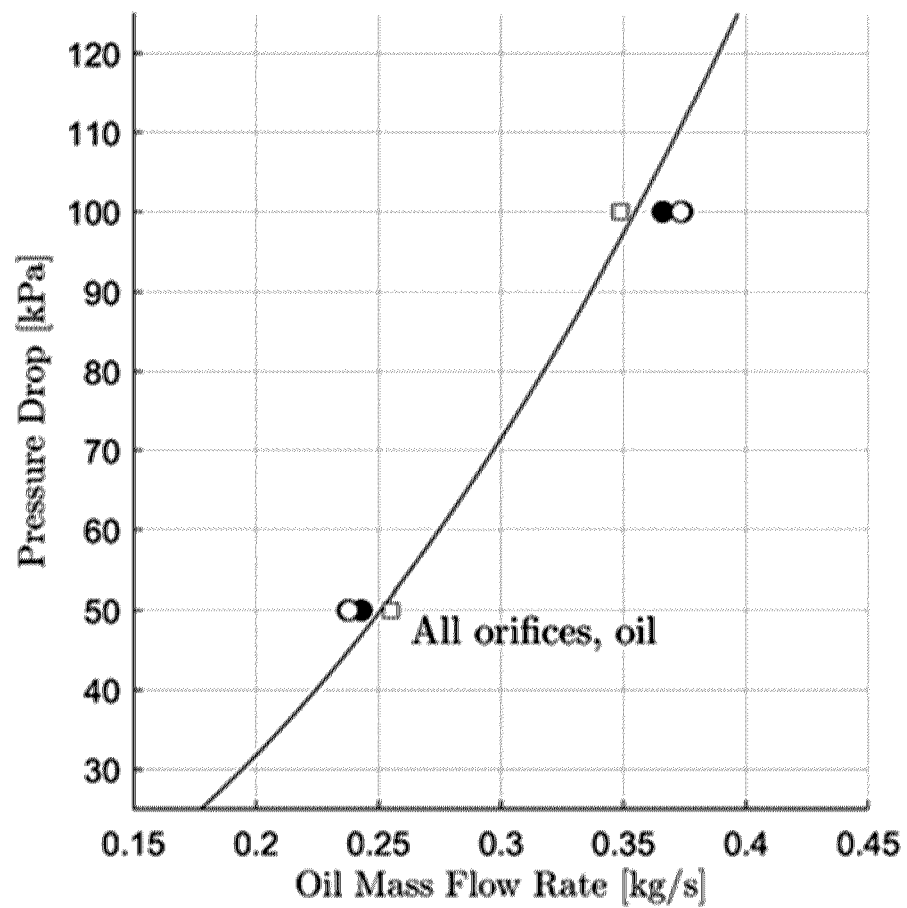

FIGS. 5 and 6 illustrate the performance of the presently described nozzle. These figures compare the flow rates of water (FIG. 5) and oil (FIG. 6) through four different nozzle geometries with respect to pressure. As shown in FIGS. 5 and 6, the geometries that were compared were: a nozzle with a long and smooth third section (such as 34 in FIG. 1); a nozzle with a short and smooth third section; a nozzle with a roughened, i.e. wavy, third section as shown in FIG. 1; and a nozzle with a grooved third section, such as that shown in FIG. 4. As illustrated in FIG. 5, for a given pressure differential, both a grooved nozzle geometry (i.e. FIG. 4) and a roughened nozzle geometry (i.e. FIG. 1) served to reduce the water flow rate as compared to a smooth nozzle geometry. It is also observed that the grooved nozzle surface provided a greater water flow reduction as compared to a nozzle with a roughened surface. Furthermore, the grooved nozzle surface provided a 37% reduction in water flowrate compared to a long and smooth surface and a 21% reduction compared to a short and smooth surface. Finally, FIG. 6 illustrates that the oil flow rate remained the same for all four nozzle types. These findings therefore illustrate the water choking capability of the roughened or grooved (collectively "uneven") nozzle surface described herein.

As would be understood, the presently described nozzle offers various advantages over water choking methods known in the art. In particular, the presently described nozzle does not include any moving parts that are reactive to changes in fluid composition etc. As such, there is no possibility of the nozzle failing due to mechanical reasons. The present nozzle is designed to be effective as the fluid composition changes, such as during water breakthrough. For example, where the fluid only comprises oil, the flow remains laminar and continues in the normal velocity. However, where water becomes included in the fluid, the nozzle continues to allow oil to flow as normal but causes the flow of the water component to be limited or choked.

Although the present nozzle has been described with reference to water choking, it will be understood that it would also be applicable for impeding or choking the flow of any gas component in an oil-bearing reservoir.

Figure 3:
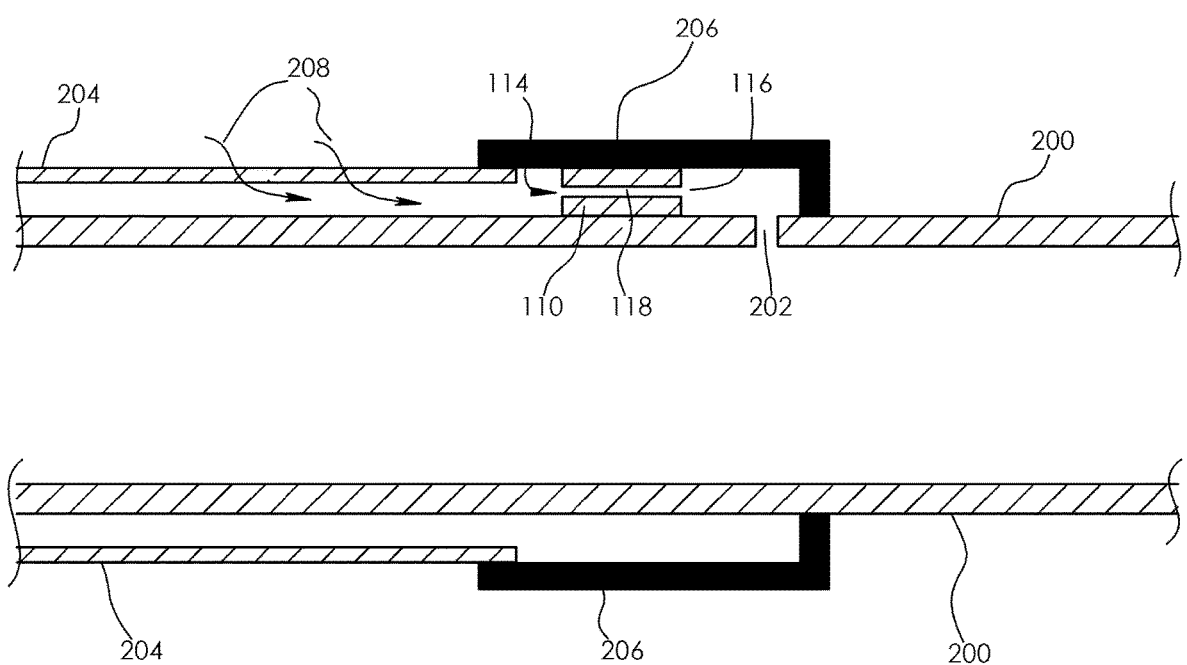
FIG. 3 is a side cross-sectional view of a flow control nozzle according to an aspect of the present description, in combination with a pipe.

FIG. 3 illustrates an apparatus comprising a pipe that is provided with a nozzle as described herein, wherein the nozzle is shown schematically at 110 and as having an inlet 114 and an outlet 116. For convenience, the passage 118 is shown without the profile as defined above. As shown, the pipe 200 comprises an elongate tubular body having a number of ports 202 along its length. The ports 202 allow fluid communication between the exterior of the pipe and its interior, or lumen. As is common, pipes used for production (i.e. production tubing) typically include a screen 204, such as a wire-wrap screen or the like, for screening fluids entering the pipe. The screen 204 serves to prevent sand or other particulate debris from the wellbore from entering the pipe. The screen 204 is provided over the surface of the pipe 200 and is retained in place by a collar 206 or any other such retaining device or mechanism. It will be understood that the present description is not limited to any type of screen 204 or screen retaining device or mechanism 206. The present description is also not limited to any number of ports 202. Furthermore, it will be appreciated that while the presence of a screen 204 is shown, the use of the presently described nozzle is not predicated upon the presence of such screen. Thus, the presently described nozzle may be used on a pipe 200 even in the absence of any screen 204. As would be understood, in cases where no screen is used, a retaining device, such as a clamp 206 or the like, will be utilized to secure nozzle 210 to the pipe 200. Alternatively, the nozzle 210 may be secured to the pipe in any other manner as would be known to persons skilled in the art.

As shown in FIG. 3, a nozzle according to the present description is shown generally at 110. It will be understood that the illustration of nozzle 110 is schematic and is not intended to limit the structure of the nozzle to any particular shape or structure. Thus, the nozzle 110 of FIG. 3 may consist of any of the nozzles described above, as shown in FIGS. 1 and 2 or any other nozzle configuration in accordance with the present description.

As shown in FIG. 3, the nozzle 110 is positioned on the outer surface of the pipe 200 and located proximal to the port 202. As discussed further below, the positioning of the nozzle 110 forces any fluids entering the port 202 to first pass through the nozzle 110.

In use, the pipe 200 is provided with the nozzle 110 and, where needed, the screen 204. The pipe 200 is then inserted into a wellbore to begin the production procedure. During production, wellbore fluids, as shown at 208, pass through the screen 204 (if present) and are diverted to the nozzle 110. As discussed above, the nozzle 110 has a passageway 118 with the three sections previously described, but not shown in FIG. 3 for convenience. Where the wellbore fluids comprise desired hydrocarbons, such as oil, flow through the nozzle 110 is uninterrupted and such fluids enter into the port 202 and flow into the pipe, or production tubing 200 and subsequently brought to the surface. However, where the fluids 208 include a water (and/or gas) component, the nozzle 110 functions as described above and chokes the flow of such low density fluid component.

Although the above description includes reference to certain specific embodiments, various modifications thereof will be apparent to those skilled in the art. Any examples provided herein are included solely for the purpose of illustration and are not intended to be limiting in any way. In particular, any specific dimensions or quantities referred to in the present description is intended only to illustrate one or more specific aspects are not intended to limit the description in any way. Any drawings provided herein are solely for the purpose of illustrating various aspects of the description and are not intended to be drawn to scale or to be limiting in any way. The scope of the claims appended hereto should not be limited by the preferred embodiments set forth in the above description but should be given the broadest interpretation consistent with the present specification as a whole. The disclosures of all prior art recited herein are incorporated herein by reference in their entirety.

I claim:

1. A nozzle for controlling the flow of a water and/or gas component of a fluid comprising a mixture of oil and water and/or gas, into a pipe, the pipe having at least one port along its length, the nozzle being adapted to be located on the exterior of the pipe and adjacent one of the at least one port, the nozzle comprising:
a body having an inlet, an outlet, and a generally cylindrical fluid conveying passage extending between the inlet and outlet;
wherein the fluid conveying passage comprises:
an inlet portion proximal to the inlet and having a converging region with a reducing diameter in a direction from the inlet to the outlet;
an outlet portion proximal to the outlet and having a diverging region with an increasing diameter in a direction from the inlet to the outlet; and
a central section extending between the inlet portion and the outlet portion, the central section comprising a passage formed by a wall having an uneven surface.

2. The nozzle of claim 1, wherein the uneven surface is wavy surface comprising a plurality of peaks and valleys.

3. The nozzle of claim 1, wherein the uneven surface is a grooved surface comprising a plurality of planar ridges separated by grooves.

4. The nozzle of claim 1, wherein the converging region of the inlet portion has a gradually reducing diameter.

5. The nozzle of claim 1, wherein the converging region has a smooth wall.

6. The nozzle of claim 1, wherein the diverging region of the outlet portion has a gradually increasing diameter.

7. The nozzle of claim 1, wherein the diverging region has a smooth wall.

8. The nozzle of claim 1, wherein:
the inlet region has a diameter ranging from an inlet diameter D1 to a reduced diameter D2;
the outlet region has a diameter ranging from a diameter D3 downstream of the central section to a diameter D4 at the outlet;
and wherein D1 is greater than D2 and D4 is greater than D3.

9. The nozzle of claim 8, wherein diameter D1 is greater than or equal to diameter D4.

10. An apparatus for controlling flow, from a subterranean reservoir, of a water and/or gas component, of a fluid comprising a mixture of oil and water and/or gas, the apparatus comprising a pipe having at least one port along its length, and at least one nozzle adapted to be located on the exterior of the pipe and adjacent one of the at least one port, the nozzle comprising:
a body having an inlet, an outlet, and a fluid conveying passage extending between the inlet and outlet;
wherein the fluid conveying passage comprises:
an inlet portion proximal to the inlet and having a converging region with a reducing diameter in a direction from the inlet to the outlet;
an outlet portion proximal to the outlet and having a diverging region with an increasing diameter in a direction from the inlet to the outlet; and
a central section extending between the inlet portion and the outlet portion, the central section comprising a passage formed by a wall having an uneven surface; and
the apparatus further comprising a means for locating the nozzle on the pipe adjacent the port.

11. The apparatus of claim 10, wherein the means for locating the nozzle comprises a clamp.

12. The apparatus of claim 10, wherein the apparatus further comprises a sand screen and wherein the nozzle is positioned to receive fluids passing through the sand screen prior to entering the port.

13. The apparatus of claim 10, wherein the uneven surface is wavy surface comprising a plurality of peaks and valleys.

14. The apparatus of claim 10, wherein the uneven surface is a grooved surface comprising a plurality of planar ridges separated by grooves.

15. The apparatus of claim 10, wherein the converging region of the inlet portion has a gradually reducing diameter.

16. The apparatus of claim 10, wherein the converging region has a smooth wall.

17. The apparatus of claim 10, wherein the diverging region of the outlet portion has a gradually increasing diameter.

18. The apparatus of claim 10, wherein the diverging region has a smooth wall.

19. The apparatus of claim 10, wherein:
the inlet region has a diameter ranging from an inlet diameter D1 to a reduced diameter D2;

the outlet region has a diameter ranging from a diameter D3 downstream of the central section to a diameter D4 at the outlet;

and wherein D1 is greater than D2 and D4 is greater than D3.

20. The apparatus of claim 19, wherein diameter D1 is greater than or equal to diameter D4.

* * * * *